A. T. DAWSON & G. T. BUCKHAM.
BREECH LOADING ORDNANCE.
APPLICATION FILED AUG. 14, 1907.

921,960.

Patented May 18, 1909.

A. T. DAWSON & G. T. BUCKHAM.
BREECH LOADING ORDNANCE.
APPLICATION FILED AUG. 14, 1907.

921,960.

Patented May 18, 1909.
7 SHEETS—SHEET 4.

A. T. DAWSON & G. T. BUCKHAM.
BREECH LOADING ORDNANCE.
APPLICATION FILED AUG. 14, 1907.

921,960.

Patented May 18, 1909.
7 SHEETS—SHEET 5.

A. T. DAWSON & G. T. BUCKHAM.
BREECH LOADING ORDNANCE.
APPLICATION FILED AUG. 14, 1907.

921,960.

Patented May 18, 1909.
7 SHEETS—SHEET 6.

A. T. DAWSON & G. T. BUCKHAM.
BREECH LOADING ORDNANCE.
APPLICATION FILED AUG. 14, 1907.

921,960.

Patented May 18, 1909.
7 SHEETS—SHEET 7.

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS SONS & MAXIM LIMITED, OF LONDON, ENGLAND.

BREECH-LOADING ORDNANCE.

No. 921,960.            Specification of Letters Patent.            Patented May 18, 1909.

Application filed August 14, 1907. Serial No. 388,569.

*To all whom it may concern:*

Be it known that we, ARTHUR TREVOR DAWSON, lieutenant royal navy, director and superintendent of ordnance works, and GEORGE THOMAS BUCKHAM, engineer, both subjects of the King of Great Britain, residing at 32 Victoria street, Westminster, in the county of London, England, have invented certain new and useful Improvements Relating to Breech-Loading Ordnance, of which the following is a specification.

This invention relates to breech loading ordnance particularly howitzers and similar guns that are intended to fire at high angles of elevation.

One part of the invention has reference to the elevating gear which is of the kind that is capable of fast and slow working; that is to say, the gun can be accurately set to any required angle of elevation by means of a fine or slow movement, and can be rapidly brought to the loading position and returned again to the firing position by a fast movement, two complete sets of gear being provided, one on the left hand side for slowly elevating, and the other on the right hand side for rapidly bringing the gun to loading position and quickly returning it to firing position. This arrangement enables the slow movement to be effected by the man at the sight, and the quick movement to be effected by the man whose duty it is to attend to the breech mechanism.

According to this part of our invention we provide a curved arm which extends transversely over the gun and is adapted to rock about the axis of the gun trunnions, the said curved arm (hereinafter termed the elevating arm) being actuated together with the gun cradle from one side of the mounting to effect the slow or elevating movement by means of a slow working screw, while the quick or loading movement is effected from the other side of the mounting by causing the gun and cradle to move relatively to the elevating arm by means of a quick working screw.

According to a modification of this part of our invention we may substitute for the curved arm a straight arm pivotally arranged on the cradle-trunnion at one side of the mounting.

Another part of our present invention has reference to mechanism for automatically rotating the valve key of the recoil cylinder or brake for the purpose of varying the length of recoil of the gun, in accordance with its angle of elevation, so that the greater the angle of elevation the less will be the length of the recoil; for which purpose mechanism has already been proposed by us. According to our present improvement we use a sliding arm or lever pivotally connected with the trail. This sliding lever is articulated near its upper end so as to adjust itself automatically to the movements due to the training of the gun. The upper end is connected by suitable gearing to a longitudinal shaft which transmits motion to the valve key by means of toothed wheels or segments inclosed in a box forming a cross-stay between the return spring cases.

In order that our said invention may be clearly understood and readily carried into effect we will describe the same more fully with reference to the accompanying drawings, in which:—

Figure 1 is a side elevation, Fig. 2 a plan, and Fig. 3 a rear end view of a gun and mounting provided with our improvements. Fig. 3$^a$ is a horizontal section of the hand gear for actuating the mechanism employed for effecting the slow or elevating movement. Fig. 3$^b$ is a horizontal section of the hand gear for actuating the mechanism employed for effecting the quick or loading movement. Figs. 8, 9 and 10 are side elevations as seen from the right hand side of the gun and showing the gun in its horizontal, fully elevated, and loading position respectively. In Fig. 9 we have shown the mechanism for effecting the fast movement in section.

Fig. 16 is a side elevation, and Fig. 17 an end view showing more clearly the aforesaid mechanism for rotating the valve key. In Fig. 17 the cover plate of the box inclosing the aforesaid toothed wheels or segments has been removed. Fig. 17$^a$ is a horizontal section on the line 2—2 of Fig. 16.

Referring first more particularly to Figs. 1 to 10, A is the gun and B is the cradle in which it recoils.

B' is the recoil cylinder and B$^2$, B$^2$ are the return springs for returning the gun to firing position as is well understood.

C is the trail in which the gun cradle is trunnioned at C'.

B$^3$ is the axle of the carriage-wheels.

D is the hand wheel of the mechanism employed for effecting the slow or ordinary elevating movement of the gun and cradle, and E is the hand wheel of the mechanism employed for effecting the quick or loading movement of the gun and cradle.

F is the elevating arm which is adapted to swing about the axis of the trunnions C' (Fig. 5); for convenience of fixing in place and securing stability, the said elevating arm is in the example shown in Figs. 1 to 10 made in two parts connected together by bolts or the like at $f^\times$ each part being supported by the trunnions. On the left hand side of the trail is fixed a bracket $d$ in which is trunnioned at $d'$ a casing $d^\times$ inclosing a sleeve nut $d^2$ which engages with the slow working screw $d^3$ (hereinafter referred to as the elevating screw) whose front end is pivoted at $d^4$ to the adjacent end of the elevating arm F. The sleeve nut has at one end a bevel wheel $d^5$ with which gears a bevel wheel $d^6$ mounted on the spindle of the hand wheel D. On the right hand side of the gun is the quick working screw $e$ (hereinafter referred to as the loading screw) which is double threaded and adapted to travel in a nut $e'$ that is capable of oscillating in a boss or projection $f$ of the said elevating arm F, the rear end of this screw being inclosed in a casing $e^\times$ which is pivoted at $e^3$ to a bracket $b$ forming part of the gun-cradle B. This end of the loading screw $e$ is provided with a bevel wheel $e^4$ (Fig. 9) which gears with another bevel wheel $e^5$ mounted on the spindle of the hand wheel E, said spindle being carried by the bracket $b$.

By actuating the elevating screw $d^3$ through the hand wheel D and the bevel wheels $d^5$, $d^6$, the elevating arm F is caused to swing or turn about the trunnions C', and since the said arm is connected to the cradle by the loading screw $e$, which is situated at the other side of the gun, the gun and cradle and the said elevating arm all move together through the same angle, until the required elevation of the gun has been effected. By actuating the loading screw $e$ through the hand wheel E and the bevel wheels $e^4$ $e^5$, the gun and cradle are caused to swing or move angularly together about the axis of the trunnions C', while the elevating arm F remains stationary, the gun and cradle being thus brought rapidly to the loading position without affecting the elevating screw $d^3$ at the opposite side of the mounting and therefore without affecting the angle of elevation. After loading, the gun is returned by the said loading screw $e$, to its firing position, to which it has been previously adjusted by the elevating screw $d^3$, this position being insured by a stop $e^6$ with which the outer or forward end of the loading screw is provided.

Referring now to the modifications illustrated by Figs. 11 to 15, in which we substitute for the curved elevating arm F a simple or straight arm or lever F$^{10}$; A is the gun, B the cradle and C the trail in which it is trunnioned at C' as in the preceding arrangement. This elevating arm F$^{10}$ is, in the example shown in Figs. 11 to 14, pivoted to the cradle-trunnion at its center.

Figures 1, 2, 3A, 3B:
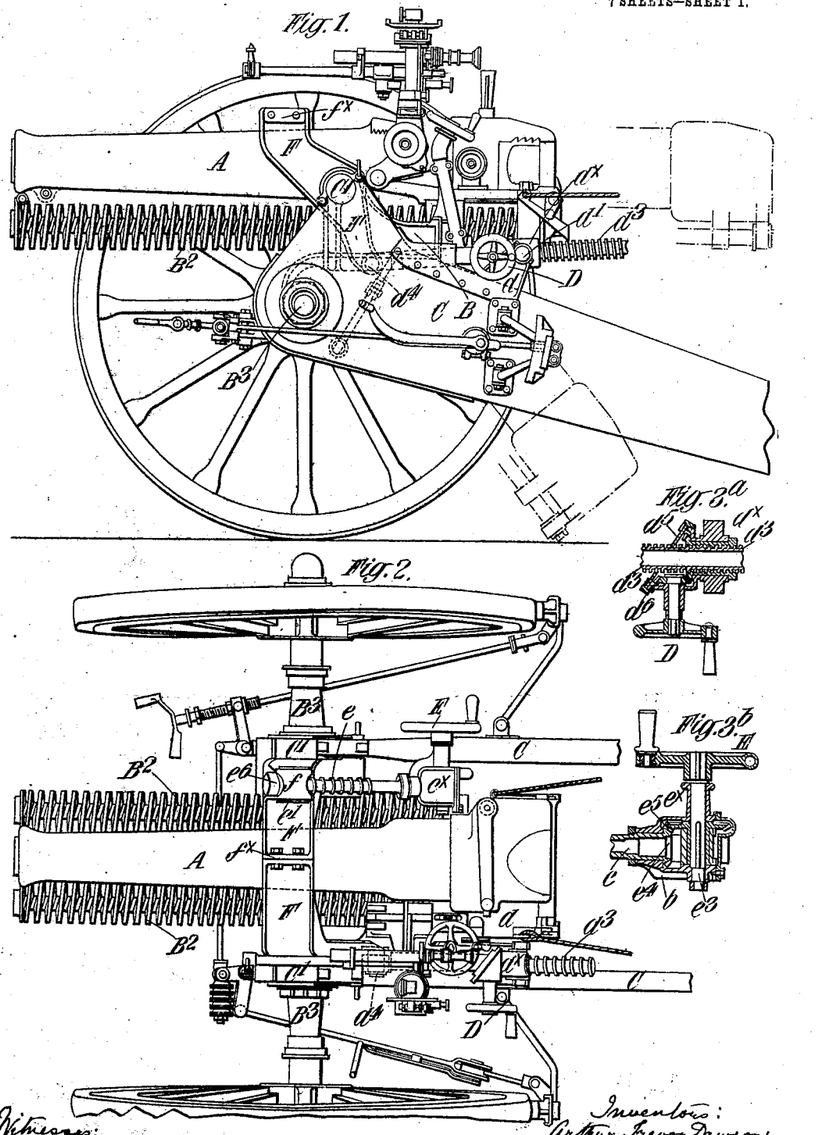
Figure 3:
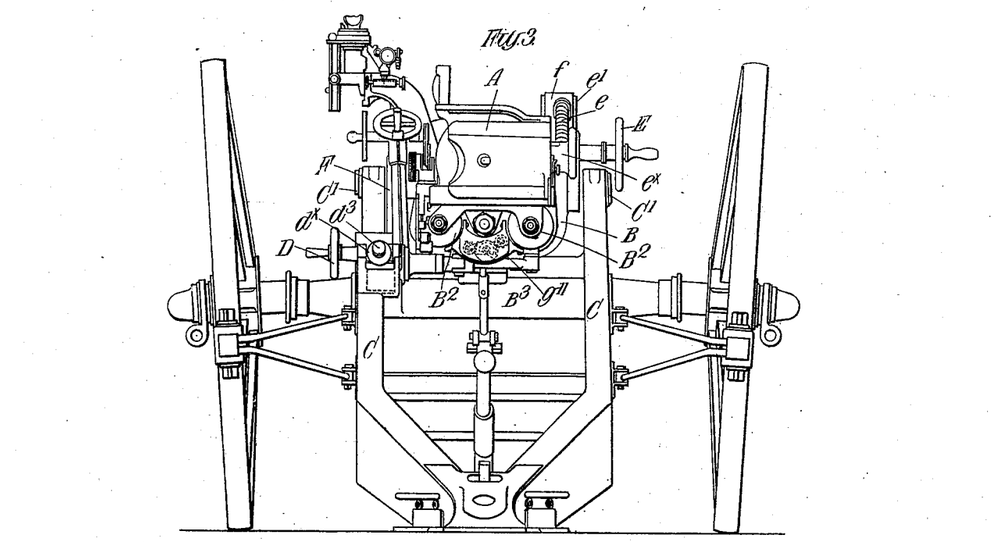
Figures 4, 5:
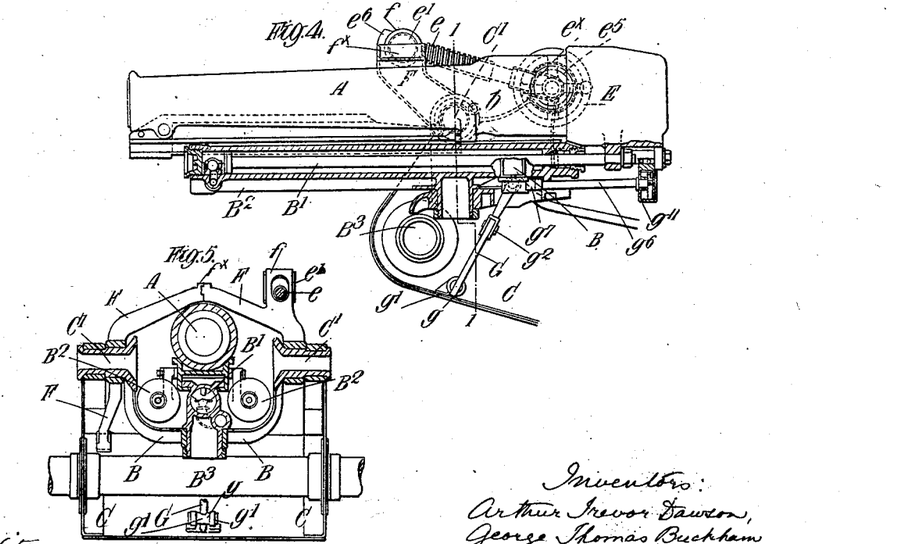
Fig. 4 is a longitudinal section through the recoil or buffer cylinder. In this figure there is shown the mechanism for automatically rotating the valve key by the change in elevation of the gun.
Fig. 5 is a vertical section taken approximately on the line 1—1 of Fig. 4.
Figure 6:
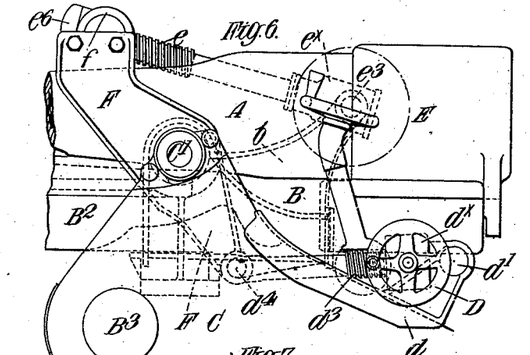
Fig. 6 is a side elevation, and Fig. 7 an end view showing more clearly the fast and slow elevating gear.
Figure 7:
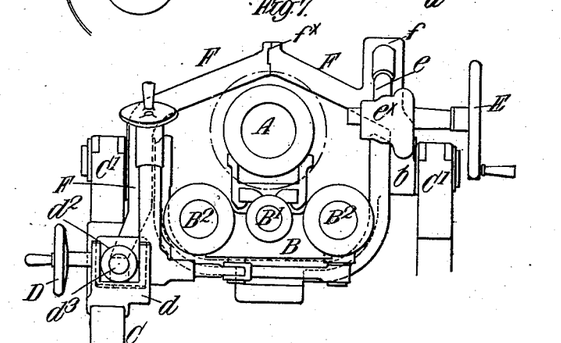
Figure 8:
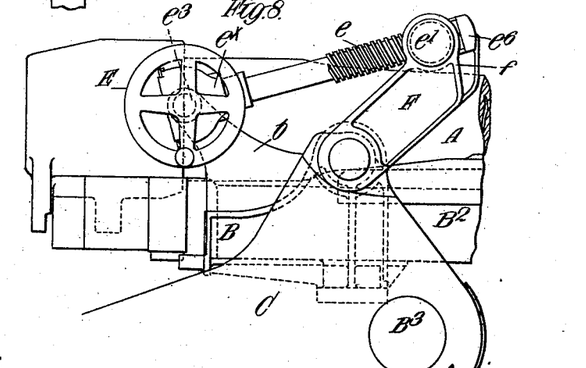
Figure 9:
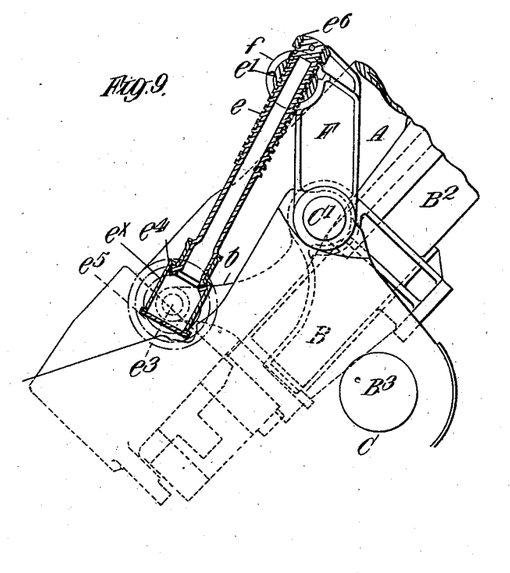
Figure 10:
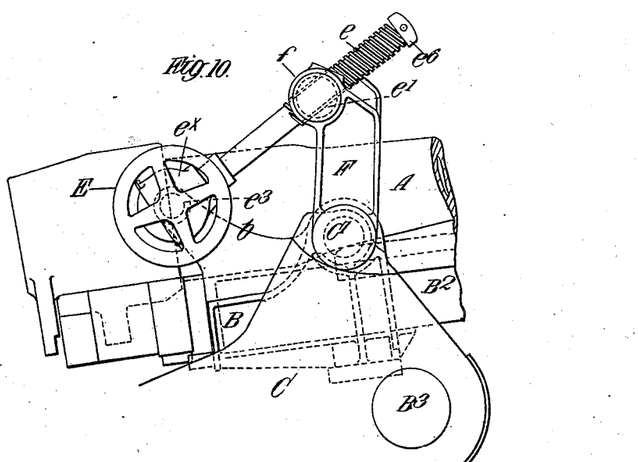
Figure 11:
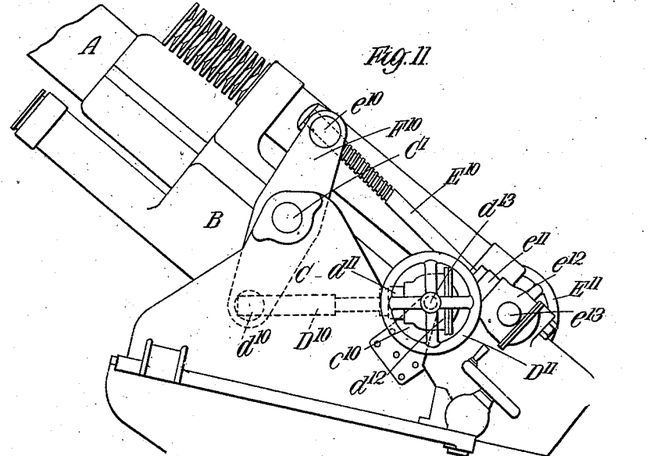
Figs. 11 and 12 are side elevations showing a modified form of the elevating and loading gear in the position it assumes when the gun is respectively at its full elevation and at its loading position.
Figure 12:
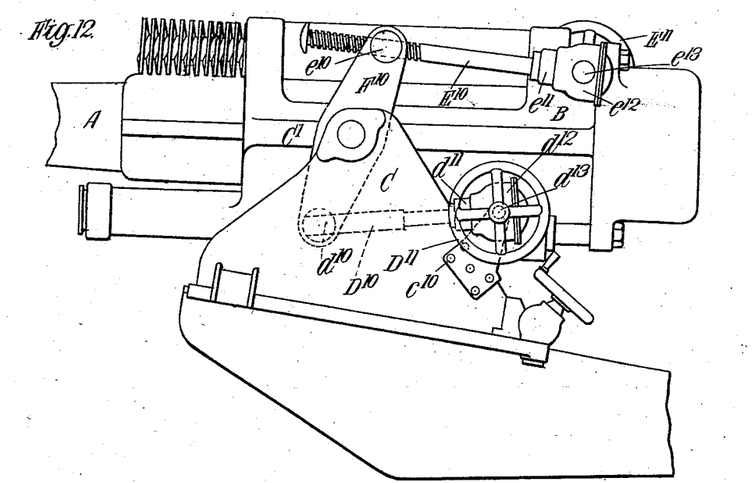
Figures 13, 14:
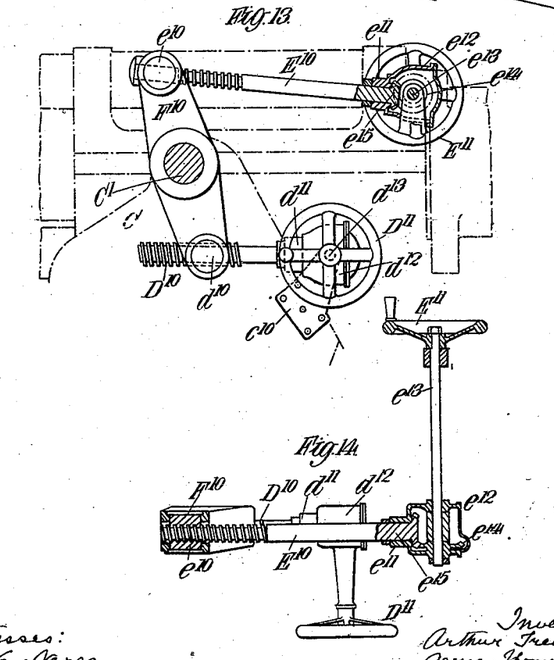
Fig. 13 is a diagrammatic sectional elevation of the said gear showing the parts thereof more clearly than in the preceding figures.
Fig. 14 is a sectional plan of the same.
Figure 15:
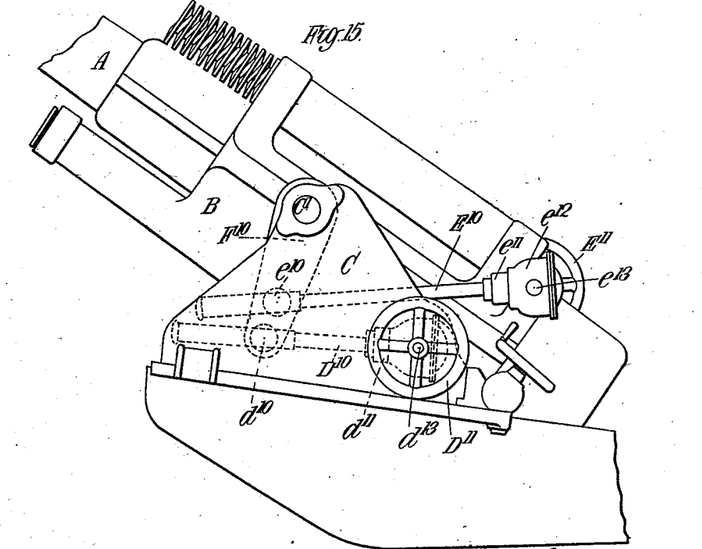
Fig. 15 is an elevation similar to Fig. 11 but shows a further modification.

D$^{10}$ is the elevating screw and E$^{10}$ is the loading screw, both of which screws are situated on the same side of the mounting as that occupied by the elevating arm F$^{10}$ and are, in Figs. 11 to 14, connected with opposite ends of the latter by means of swivel nuts $d^{10}$, $e^{10}$. The rear end of the loading screw E$^{10}$ is carried in a bearing $e^{11}$ forming part of the gear casing $e^{12}$ which is mounted on the adjacent end of a transverse spindle $e^{13}$ carried in bearings on the gun cradle C and having at its opposite end a hand wheel E$^{11}$ for actuating said spindle. Within the said casing $e^{12}$ is a bevel wheel $e^{14}$ carried by the spindle $e^{13}$ with which wheel engages a bevel pinion $e^{15}$ carried by the loading screw E$^{10}$, so that when the hand wheel E$^{11}$ is actuated, motion is transmitted to the said spindle $e^{13}$ and the loading screw. The rear end of the elevating screw D$^{10}$ is carried in a bearing $d^{11}$ forming part of the gear casing $d^{12}$ which is mounted in a bracket $c^{10}$ attached to the trail C. Within the said casing $d^{12}$ is a bevel wheel carried by a spindle $d^{13}$ whose outer end is furnished with a hand wheel D$^{11}$ for actuating it. The said bevel wheel gears with a bevel pinion carried by the elevating screw D$^{10}$ so that when the hand wheel D$^{11}$ is actuated, motion is transmitted to the said elevating screw through the bevel gearing. It will be seen that the hand wheels D$^{11}$, E$^{11}$ occupy positions at opposite sides of the mounting for enabling the elevating movement of the gun to be effected from one side, and the loading movement to be effected from the opposite side. The said hand wheels may however obviously be arranged both on the same side of the mounting, so that the elevating and loading movements of the gun can be effected from the same side of the mounting. The transverse spindle $e^{13}$ may in some cases be provided with a hand wheel at each end for enabling two men to operate the loading gear at the same time. Instead of pivoting the said elevating arm $F^{10}$ at its center to the cradle trunnion as illustrated in Figs. 11 to 14, it may be pivoted to said trunnion at one end as shown by Fig. 15, in which case, the loading and elevating screws $D^{10}$ $E^{10}$ would be connected with the elevating arm at or near the other end thereof.

Figures 16, 17, 17A:
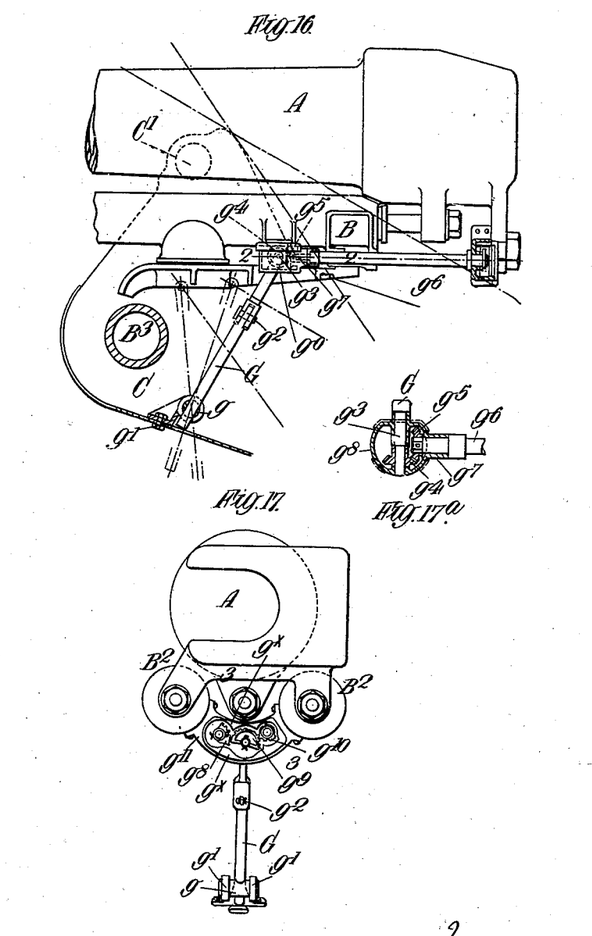

Referring now more particularly to Figs. 16, 17 and 17$^a$ which illustrate the mechanism we employ for automatically rotating the valve key of the recoil cylinder or brake for varying the length of the recoil in accordance with the angle of elevation of the gun; G is the sliding lever and $g$ is an oscillating pin with which it engages at its lower end, said pin being mounted in a bracket $g'$ bolted or otherwise attached to the trail C and being capable of turning about an axis transverse to that of the gun. The said sliding lever is articulated at $g^2$ so as to enable it to automatically adjust itself to the movements due to the training of the gun as above stated, without straining the upper portion of the lever. At its upper end the said lever is connected with a spindle $g^3$ to which is keyed or otherwise connected a bevel wheel $g^4$ that gears with a bevel wheel $g^5$ mounted on a longitudinal shaft $g^6$ which extends to the rear of the gun. This shaft is arranged parallel to the valve key and is carried by bearings $g^7$. A box $g^8$ incloses the said bevel wheels $g^4$ $g^5$ and is so constructed that for its removal it is only necessary to withdraw the longitudinal shaft $g^6$ and turn the box through a suitable angle, whereupon the bevel gear and inclosing box can be withdrawn for examination (see Fig. 17$^a$). As the angle of elevation of the gun is varied, the upper end of the sliding lever moves with the gun in an arc of a circle described from the center of the trunnions, this movement being permitted by reason of the lower end of the sliding lever being able to turn with the oscillating pin $g$ as well as to slide therein. The effect of this movement is to cause the upper end of the sliding lever to move through a greater or less angle relatively to the longitudinal shaft $g^6$ (see the dotted lines in Fig. 16) and thus turn the spindle $g^3$ carrying the bevel wheel $g^4$ to a corresponding extent, thereby imparting motion to the longitudinal shaft $g^6$ through the bevel wheel $g^5$. The rear end of the shaft $g^6$ passes into a gear box $g^{11}$ that forms a cross stay between the spring cases $B^2$ $B^2$ (Fig. 17) and the said shaft carries a toothed segment $g^8$ which engages, through an intermediate segment $g^9$, with another segment $g^{10}$ secured to the rear end of the valve key. The segments are so arranged that on elevating the gun, the segment $g^8$ slides on the segment $g^9$ without communicating any motion to the valve key segment $g^{10}$, until such an elevation has been reached that the breech end of the gun would closely approach the ground in recoil, whereupon the teeth of the segment $g^8$ by coming into contact with the teeth on the segment $g^9$ cause it, and consequently the segment $g^{10}$ and the valve key, to partially rotate and thus effect additional retardation to the recoil movement as is well understood. The interior of the box is made with a flange $g^\times$ which is of such shape (see Fig. 17) that it is necessary to bring the gun to the horizontal position shown in Fig. 17, when removing or assembling the gear wheels or segments, thereby preventing any liability of the gear wheels or segments from being inserted in place in a wrong position. In any other position of the gun the peripheries of the said gear wheels or segments would lie behind the said interior flange $g^\times$ and their detachment be prevented; or if they have been previously detached their re-insertion into place would similarly be prevented unless the gun is first brought to the horizontal position as aforesaid.

What we claim and desire to secure by Letters Patent of the United States is:—

1. In a gun carriage or mounting, the combination with the gun and its cradle trunnioned in the carriage, of an elevating arm adapted to rock about the axis of the trunnions, means carried by the cradle for causing the latter to move relatively to said arm for quickly shifting the cradle together with the gun to and from the loading position, means carried by the carriage for causing the cradle to move together with said arm for changing the elevation of the gun, and means for insuring the return of the gun, after loading, to the firing position to which it had been previously adjusted by the said elevating screw.

2. In a gun carriage or mounting, the combination with the gun and its cradle trunnioned in the carriage, of an elevating arm adapted to rock about the axis of the trunnions, a loading screw and an elevating screw connected with the said arm, means carried by the cradle for imparting motion to the loading screw and thereby causing the cradle to move relatively to said arm for quickly shifting the gun to and from its loading position, means carried by the carriage for imparting motion to the elevating screw and thereby causing the cradle to move together with said arm for changing the elevation of the gun, and means for insuring the return of the gun, after loading, to the position to which it had been previously adjusted by said elevating screw.

3. In a gun carriage or mounting, the combination with the gun and its cradle trunnioned in the carriage, of an elevating arm loosely mounted on one of the cradle trunnions, a loading screw and an elevating screw connected with said arm, means carried by the cradle for imparting motion to the loading screw and thereby causing the cradle to move relatively to said arm for quickly shifting the gun to and from its loading position, means carried by the carriage for imparting motion to the elevating screw and thereby causing the cradle to move together with said arm for changing the elevation of the gun, and means for insuring the return of the gun, after loading, to the position to which it had been previously adjusted by the said elevating screw.

4. In a gun carriage or mounting, the combination with the gun and its cradle trunnioned in the carriage, of an elevating arm adapted to rock about the axis of the trunnions, a loading screw and an elevating screw connected with said arm at opposite sides of its fulcrum, means carried by the cradle for imparting motion to the loading screw and thereby causing the cradle to move relatively to said arm for quickly shifting the gun to and from its loading position, means carried by the carriage for imparting motion to the elevating screw and thereby causing the cradle to move together with said arm for changing the elevation of the gun, and means for limiting the extent of movement of said cradle when shifted from the loading to the firing position.

5. In a gun carriage or mounting, the combination with the gun and its cradle trunnioned in the carriage, of an elevating arm adapted to rock about the axis of the trunnions, a loading screw and an elevating screw connected with said arm, toothed gearing carried by the cradle for imparting motion to the loading screw, toothed gearing carried by the carriage for imparting motion to said elevating screw, means for actuating said toothed gearing, and means for insuring the return of the gun, after loading, to the position to which it had been previously adjusted by the said elevating screw.

6. In a gun carriage or mounting, the combination with the gun and its cradle trunnioned in the carriage, of an elevating arm adapted to rock about the axis of the trunnions, a loading screw and an elevating screw connected with said arm, a transverse hand-actuated spindle on the cradle, toothed gearing connecting said spindle with the loading screw, a gearing connecting said spindle with the elevating screw, and a stop on the forward end of the loading screw adapted to engage with the elevating arm when the cradle is returned from the loading to the firing position to which it had been previously adjusted by said elevating screw.

7. In a gun carriage or mounting, the combination with the gun and its cradle trunnioned in the carriage, of an elevating arm adapted to rock about the axis of the trunnions, a loading screw and an elevating screw pivotally connected at their forward parts with said arm, a transverse hand-actuated spindle on the cradle, toothed gearing connecting said spindle with the loading screw, a transverse hand-actuated spindle on the carriage, toothed gearing connecting said spindle with the elevating screw, and a stop on the forward end of the loading screw adapted to engage with the elevating arm when the cradle is returned from the loading to the firing position to which it had been previously adapted by the said elevating screw.

8. In a gun carriage or mounting, the combination with the gun, the cradle trunnioned in the carriage, the recoil cylinder or brake and its valve key, of a sliding arm pivotally connected at its upper end to the cradle, an oscillating pin attached to the trail through which the said sliding arm can slide, and means whereby the angular movement that the pivoted upper end of the sliding arm receives in varying the angle of elevation of the gun is transmitted to the said valve key.

9. In a gun carriage or mounting, the combination with the gun, the cradle trunnioned in the carriage, the recoil cylinder or brake and its valve key; of a sliding arm pivotally connected at its lower end to the carriage and at its upper end to the cradle, a longitudinal shaft carried by the cradle, gearing connecting the forward end of said shaft with the pivotal upper end of said sliding arm and gearing connecting the rear end of said shaft with the valve key.

10. In a gun carriage or mounting, the combination with the gun, the cradle trunnioned in the carriage, the recoil cylinder or brake and its valve key; of a lever pivotally connected at its lower end to the carriage and at its upper end to the cradle, a longitudinal shaft carried by the cradle, gearing connecting the forward end of said shaft with the pivotal upper end of said lever, and gearing connecting the rear end of said shaft with the valve key.

11. In a gun carriage or mounting, the combination with the gun, the cradle trunnioned in the carriage, the recoil cylinder or brake and its valve key; of a sliding arm pivotally connected at its lower end to the carriage and at its upper end to the cradle, a longitudinal shaft carried by the cradle, gearing connecting the forward end of said shaft with the pivotal upper end of said sliding arm, a toothed segment at the rear end of said shaft, a toothed segment at the rear end of the valve key, an intermediate toothed segment gearing with the toothed segment of the valve key for transmitting to the latter the motion of the toothed segment of the said shaft, a casing attached to the return spring casings and inclosing said toothed segments, and means whereby the said toothed segments can only be detached or replaced when the gun occupies a particular position of elevation.

12. In a gun carriage or mounting, the combination with the gun, the cradle trunnioned in the carriage, the recoil cylinder or brake and its valve key; of a lever pivotally connected at its lower end to the carriage and at its upper end to the cradle, a longitudinal shaft carried by the cradle, gearing connecting the forward end of said shaft with the pivotal upper end of said lever, a toothed segment at the rear end of said shaft, a toothed segment at the rear end of the valve key, an intermediate toothed segment gearing with the toothed segment of the valve key for transmitting to the latter the motion of the toothed segment of the said shaft, a casing attached to the return spring casings and inclosing said toothed segments, and means whereby the said toothed segments can only be detached or replaced when the gun occupies a particular position of elevation.

13. In a gun carriage or mounting, the combination with the gun, the cradle trunnioned in the carriage, the recoil cylinder or brake and its valve key; of a sliding arm pivotally connected at its lower end to the carriage and at its upper end to the cradle, a longitudinal shaft carried by the cradle, gearing connecting the forward end of said shaft with the pivotal upper end of said sliding arm, a toothed segment situated at the rear end of said shaft and having a plain portion, a toothed segment at the rear end of the valve key, an intermediate toothed segment gearing with the toothed segment of the valve key and having a plain portion corresponding with that of the toothed segment carried by the aforesaid shaft, a casing attached to the return spring casing and inclosing said toothed segments, and means whereby the said toothed segments can only be detached or replaced when the gun occupies a particular position of elevation.

14. In a gun carriage or mounting, the combination with the gun, the cradle trunnioned in the carriage, the recoil cylinder or brake and its valve key; of a lever pivotally connected at its lower end to the carriage and at its upper end to the cradle, a longitudinal shaft carried by the cradle, gearing connecting the forward end of said shaft with the pivotal upper end of said lever, a toothed segment situated at the rear end of said shaft and having a plain portion, a toothed segment at the rear end of the valve key, an intermediate toothed segment gearing with the toothed segment of the valve key and having a plain portion corresponding with that of the toothed segment carried by the aforesaid shaft, a casing attached to the return spring casing and inclosing said toothed segments, and means whereby the said toothed segments can only be detached or replaced when the gun occupies a particular position of elevation.

15. In a gun carriage or mounting, the combination with the gun and cradle trunnioned in the carriage, the recoil cylinder or brake and its valve key; of a sliding arm pivotally connected at its lower end to the carriage and at its upper end to the cradle, means whereby the said sliding arm is capable of adapting itself to the changes in position of the gun during its training movements, and means whereby the angular movement that the pivoted upper end of the sliding arm receives in varying the angle of elevation of the gun is transmitted to the said valve key.

16. In a gun carriage or mounting, the combination with the gun, the cradle trunnioned in the carriage, the recoil cylinder or brake and its valve key; of a sliding arm pivotally connected at its lower end to the carriage and at its upper end to the cradle, a joint in said sliding arm permitting it to bend in a plane transverse to the axis of the gun, a longitudinal shaft carried by the cradle, gearing connecting the forward end of said shaft with the pivotal upper end of said sliding arm, and gearing connecting the rear end of said shaft with the valve key.

17. In a gun carriage or mounting, the combination with the gun, the cradle trunnioned in the carriage, the recoil cylinder or brake and its valve key; of a lever pivotally connected at its lower end to the carriage and at its upper end to the cradle, a joint in said lever permitting it to bend in a plane transverse to the axis of the gun, a longitudinal shaft carried by the cradle, gearing connecting the forward end of said shaft with the pivotal upper end of said lever, and gearing connecting the rear end of said shaft with the valve key.

18. In a gun carriage or mounting, the combination with the gun, the cradle trunnioned in the carriage, the recoil cylinder or brake and its valve key; of a sliding arm pivotally connected at its upper end to the cradle, an oscillatory pin movable about a transverse axis on a stationary part of the carriage and loosely engaging with the lower end of said sliding arm, and means whereby the angular movement that the pivoted upper end of the sliding arm receives in varying the angle of elevation of the gun, is transmitted to the said valve key.

19. In a gun carriage or mounting, the combination with the gun, the cradle trunnioned in the carriage, the recoil cylinder or brake and its valve key; of a lever pivotally connected at its upper end to the cradle, an oscillatory pin movable about a transverse axis on a stationary part of the carriage and loosely engaging with the lower end of said lever, and means whereby the angular movement that the pivoted upper end of the lever receives in varying the angle of elevation of the gun, is transmitted to the said valve key.

In testimony whereof we affix our signatures in presence of two witnesses.

ARTHUR TREVOR DAWSON.
GEORGE THOMAS BUCKHAM.

Witnesses:
 HENRY KING,
 ALFRED PEAKS.